(12) United States Patent
Michaelsen et al.

(10) Patent No.: US 10,356,677 B2
(45) Date of Patent: Jul. 16, 2019

(54) RE-ESTABLISHMENT PROCEDURE IN DUAL CONNECTIVITY NETWORKS

(71) Applicant: Nokia Solutions and Networks Oy, Espoo (FI)

(72) Inventors: Per Henrik Michaelsen, Aalborg (DK); Tero Henttonen, Espoo (FI); Klaus Ingemann Pedersen, Aalborg (DK); Simone Barbera, Aalborg (DK); Woonhee Hwang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/311,551

(22) PCT Filed: May 19, 2014

(86) PCT No.: PCT/EP2014/060237
§ 371 (c)(1),
(2) Date: Nov. 16, 2016

(87) PCT Pub. No.: WO2015/176738
PCT Pub. Date: Nov. 26, 2015

(65) Prior Publication Data
US 2017/0099621 A1  Apr. 6, 2017

(51) Int. Cl.
*H04L 5/00* (2006.01)
*H04W 36/00* (2009.01)
(Continued)

(52) U.S. Cl.
CPC .......... *H04W 36/08* (2013.01); *H04L 5/001* (2013.01); *H04L 5/0098* (2013.01);
(Continued)

(58) Field of Classification Search
CPC .......... H04W 36/08; H04W 36/0033; H04W 76/046; H04W 76/15; H04W 36/0069;
(Continued)

(56) References Cited

U.S. PATENT DOCUMENTS

2014/0056243 A1   2/2014 Pelletier et al. .............. 370/329
2015/0359030 A1*  12/2015 Yamamoto ............ H04W 76/18
                                                370/329
(Continued)

OTHER PUBLICATIONS

3GPP TS 36.331 V12.1.09 (Mar. 2014), "3$^{rd}$ Generation Partnership Project; Technical specification Group Radio Access Network; Evolved Universal Terrestrial Radio Access (E-UTRA); Radio Resource Control (RRC); Protocol specification (Release 12)", 356 pgs.

(Continued)

*Primary Examiner* — Nam T Huynh
(74) *Attorney, Agent, or Firm* — Harrington & Smith (57) ABSTRACT

A method and apparatus are provided. The method includes providing a primary secondary cell by a second node for a user equipment operating in dual connectivity with a first node and the second node; and receiving a request from the user equipment requesting that the primary secondary cell provide the functionality of a primary cell for the user equipment when a radio link between the user equipment and a primary cell provided by the first node is lost.

19 Claims, 6 Drawing Sheets

(51) Int. Cl.
*H04W 36/08* (2009.01)
*H04W 36/30* (2009.01)
*H04W 76/15* (2018.01)
*H04W 76/19* (2018.01)

(52) U.S. Cl.
CPC .... *H04W 36/0033* (2013.01); *H04W 36/0011* (2013.01); *H04W 36/0027* (2013.01); *H04W 36/0069* (2018.08); *H04W 36/305* (2018.08); *H04W 76/15* (2018.02); *H04W 76/19* (2018.02)

(58) Field of Classification Search
CPC ... H04W 76/19; H04W 36/305; H04W 76/18; H04W 36/04; H04W 76/27; H04W 76/36; H04W 36/0055; H04W 36/28; H04W 84/045
See application file for complete search history.

(56) References Cited

U.S. PATENT DOCUMENTS

2016/0242226 A1* 8/2016 Fushiki ................. H04W 24/04
2016/0338137 A1* 11/2016 Mishra ................. H04W 36/08
2017/0265242 A1* 9/2017 Yang ................. H04W 76/027

OTHER PUBLICATIONS

3GPP TS 36.423 V12.1.0 (Mar. 2014), "3$^{rd}$ Generation Partnership project; Technical Specification Group Radio Access Network; Evolved Universal Terrestrial Radio Access Network (E-TRAN); X2 application protocol (X2AP) (Release 12)", 144 pgs.

3GPP TR 36.842 V12.0.0 (Dec. 2013), "3$^{rd}$ Generation Partnership Project; Technical Specification Group Radio Access Network; Study on Small Cell Enhancements for E-UTRA and E-UTRAN; Higher layer aspects (Release 12)", 71 pgs.

3GPP TSG RAN WG2 Meeting #83, R2-132766, Barcelona, Spain, Aug. 19-23, 2013, "Some considerations on RLM and RLF supporting dual connectivity", Alcatel-Lucent, Alcatel-Lucent Shanghai Bell, 2 pgs.

3GPP TSG-RAN WG2 Meeting #81bis, R2-131423, Chicago, Apr. 15-19, 2013, "Re-establishment Enhancements for HetNet", Nokia Siemens Networks, Nokia Corporation, 7 pgs.

3GPP TSG-WG2 #86, R2-142676, Seoul, South Korea, May 19-23, 2014, "Introduction of Dual Connectivity", NTT Docomo, Inc., 59 pgs.

* cited by examiner

RE-ESTABLISHMENT PROCEDURE IN DUAL CONNECTIVITY NETWORKS

FIELD

The present application relates to procedures carried out in dual connectivity and in particular but not exclusively to the re-establishment of a radio resource control connection for a user equipment operating in dual connectivity.

BACKGROUND

A communication system may be seen as a facility that enables communication sessions between two or more nodes such as fixed or mobile communication devices, access points such as nodes, base stations, servers, hosts, machine type servers, routers, and so on. A communication system and compatible communicating devices typically operate in accordance with a given standard or specification which sets out what the various entities associated with the system are permitted to do and how that should be achieved. For example, the standards, specifications and related protocols may define the manner how communication devices shall communicate with the access points, how various aspects of the communications shall be implemented and how the devices and functionalities thereof shall be configured.

An example of cellular communication systems is an architecture that is being standardized by the 3rd Generation Partnership Project (3GPP). A recent development in this field is often referred to as the long-term evolution (LTE) or long-term evolution advanced (LTE advanced) of the Universal Mobile Telecommunications System (UMTS) radio-access technology. In LTE base stations providing the cells are commonly referred to as enhanced NodeBs (eNB). An eNB may provide coverage for an entire cell or similar radio service area.

A user may access the communication system by means of an appropriate communication device. A communication device of a user is often referred to as user device (UE), user device or terminal. A communication device is provided with an appropriate signal receiving and transmitting arrangement for enabling communications with other parties. In wireless systems a communication device typically provides a transceiver station that may communicate with another communication device such as e.g. a base station. A communication device such as a user device (UE) may access a carrier provided by a base station, and transmit and/or receive on the carrier.

Capacity of a communication system may be improved by providing network densification—increasing a number of network nodes and decreasing an average distance between user equipment and network nodes. One method of increasing densification of a network is to provide smaller nodes (for example low power nodes) under the control of more powerful macro nodes. The smaller nodes may provide the network with an increased traffic capacity while the macro nodes may provide service availability for the coverage area.

In dual connectivity, a user equipment is connected to both a master node and a secondary node at the same time. An example of this is a system with both macro nodes and small nodes deployed, and a dual connectivity UE may carry out simultaneous (dual) communication with a macro node and a small node. The functionality of the macro and small nodes may be arranged in different ways, for example control signaling may be carried out through the macro node while data signaling may be carried out through the small node and/or uplink and downlink connectivity may be separated between the macro and small node and/or part of the data signaling may be carried out through the small node to achieve offloading of the macro node Connection re-establishment is carried out for a user equipment when a connection to serving node has failed, for example in the case of a failed handover and/or due to a radio link failure in serving node. In connection re-establishment, a link between a user equipment and serving node is re-established and then reconfiguration may be carried out to re-establish the radio bearers for the communication.

In the case of dual connectivity network this re-establishment may become more complicated. Embodiments of the present application aim to address the re-establishment procedure in dual connectivity networks.

According to a first aspect, there is provided a method comprising: providing a primary cell by a first node for a user equipment operating in dual-connectivity with the first node and a second node; and configuring the user equipment to send a request to a primary secondary cell provided by the second node requesting that the primary secondary cell provide the functionality of the primary cell for the user equipment when a radio link between the user equipment and the primary cell is lost.

Alternatively, the first aspect may comprise a method comprising: providing a primary cell by a first node for a user equipment operating in dual-connectivity with the first node and a second node; and configuring the second node to provide the functionality of the primary node in response to a request from the user equipment when a radio link between the user equipment and the primary cell is lost.

The second node may be configured by the first node providing a user context to the second node. The user context may for example be provided during a dual connectivity set up procedure.

The method may further comprise providing a user equipment context to the primary secondary cell. The user equipment context may comprise information relating to carrying out the functionality of a primary cell. The functionality of the primary cell may comprise providing a radio resource control connection for the user equipment. The user equipment context may comprise information relating to providing a radio resource control connection. The user equipment context may comprise radio resource control connection parameters for the user equipment.

The method may further comprise providing a user equipment context to the primary secondary cell during a dual connectivity setup procedure. Configuring the user equipment may further comprise configuring the user equipment during a dual connectivity configuration procedure. The method may further comprise receiving a request from the primary secondary cell to release the primary cell for the user equipment. The method may further comprise releasing a primary cell for the user equipment in response to the release message.

The user equipment may be in dual connectivity with a master access node and a secondary access node, wherein the master access node provides the primary cell for the UE and the secondary access node provides the primary secondary cell for the UE.

According to a second aspect, there is provided a network access node comprising at least one processor and a memory, the at least one processor and memory configured to: provide a primary cell for a user equipment operating in dual connectivity with the network access node and a second node; and configure the user equipment to send a request to a primary secondary cell provided by the second node requesting that the primary secondary cell provide the functionality of the primary cell for the user equipment when a radio link between the user equipment and the primary cell is lost The network access node may be a master network access node.

The network access node may be further configured to provide a user equipment context to the primary secondary cell. The network access node may be further configured to provide a user equipment context to the primary secondary cell during a dual connectivity setup procedure.

Configuring the user equipment may further comprise configuring the user equipment during a dual connectivity configuration procedure. The network access node may be further configured to receive a request from the primary secondary cell to release the primary cell for the user equipment. The network access node may be further configured to release a primary cell for the user equipment in response to the release message.

According to a third aspect, there is provided a method comprising: providing a primary secondary cell by a second node for a user equipment operating in dual connectivity with a first node and the second node; and receiving a request from the user equipment requesting that the primary secondary cell provide the functionality of a primary cell for the user equipment when a radio link between the user equipment and a primary cell provided by the first node is lost.

The method may further comprise providing the functionality of the primary cell for the user equipment in response to the request. The method may further comprise receiving a user equipment context from the primary cell. The user equipment context may comprise information relating to carrying out the functionality of a primary cell. The functionality of the primary cell may comprise providing a radio resource control connection for the user equipment. The user equipment context may comprise information relating to providing a radio resource control connection. The user equipment context may comprise radio resource control connection parameters for the user equipment.

The method may further comprise receiving a user equipment context from the primary secondary cell during a dual connectivity setup procedure. The method may further comprise determining that the request from the user equipment corresponds to a user equipment context received from the primary cell. The method may further comprise generating dual connectivity configuration information for the user equipment.

According to a fourth aspect, there may be provided a network access node comprising at least one processor and a memory, the at least one processor and memory configured to: provide a primary secondary cell for a user equipment operating in dual connectivity with a first node and the network access node; and receive a request from the user equipment requesting that the primary secondary cell provide the functionality of a primary cell for the user equipment when a radio link between the user equipment and the primary cell provided by the first node is lost.

The network access node may be a secondary network access node. The network access node may be further configured to provide the functionality of the primary cell for the user equipment in response to the request. The network access node may be further configured to receive a user equipment context from the primary cell. The network access node may be further configured to receive a user equipment context from the primary secondary cell during a dual connectivity setup procedure.

The network access node may be further configured to determine that the request from the user equipment corresponds to a user equipment context received from the primary cell. The network access node may be further configured to generate dual connectivity configuration information for the user equipment.

According to a fifth aspect, there is provided a method comprising: determining by a user equipment operating in dual connectivity with a primary cell provided by a first node and a primary secondary cell provided by a second node that a radio link with the primary cell is lost; and sending a request to the primary secondary cell requesting that the primary secondary cell provide the functionality of the primary cell for the user equipment.

The method may further comprise receiving a configuration message from the primary cell configuring the user equipment to send a request to a primary secondary cell requesting that the primary secondary cell provide the functionality of the primary cell for the user equipment when a radio link between the user equipment and the primary cell is lost.

The configuration message may be received during a dual connectivity configuration procedure. The method may further comprise receiving a response to the request from a secondary primary cell. The response to the request may comprise dual connectivity configuration information for the user equipment. The functionality of the primary cell may comprise providing a radio resource control connection for the user equipment.

The user equipment may be in dual connectivity with a master access node and a secondary access node, wherein the master access node provides the primary cell for the UE and the secondary access node provides the primary secondary cell for the UE.

According to a sixth aspect, there is provided an apparatus comprising at least one processor and a memory, the at least one processor and memory configured operating in dual connectivity with a primary cell provided by a first node and a primary secondary cell provided by a second node, the apparatus further configured to: determine that a radio link with the primary cell is lost; and send a request to the primary secondary cell requesting that the primary secondary cell provide the functionality of the primary cell for the user equipment.

The apparatus may be further configured to receive a configuration message from the primary cell configuring the user equipment to send a request to a primary secondary cell requesting that the primary secondary cell provide the functionality of the primary cell for the user equipment when a radio link between the user equipment and the primary cell is lost. The apparatus may be further configured to receive a response to the request from a secondary primary cell.

According to a seventh aspect, there is provided a system comprising: a primary cell provided by a first node; a primary secondary cell provided by a second node; and a user equipment in dual connectivity with the primary and primary secondary cells; wherein during a dual connectivity configuration of the user equipment, the user equipment is configured to send a request to a primary secondary cell requesting that the primary secondary cell provide the functionality of the primary cell for the user equipment when a radio link between the user equipment and the primary cell is lost.

Embodiments of the present application will now be described with reference to the following figures in which.

DESCRIPTION

Before explaining in detail the exemplifying embodiments, certain general principles of a wireless communication system and mobile communication devices are briefly explained with reference to FIG. 1 to assist in understanding the technology underlying the described examples.

In a wireless communication system mobile communication devices or user equipment (UE) 102, 103, 104 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 1 control apparatus 108 and 109 are shown to control the respective macro or master level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

Figure 1:
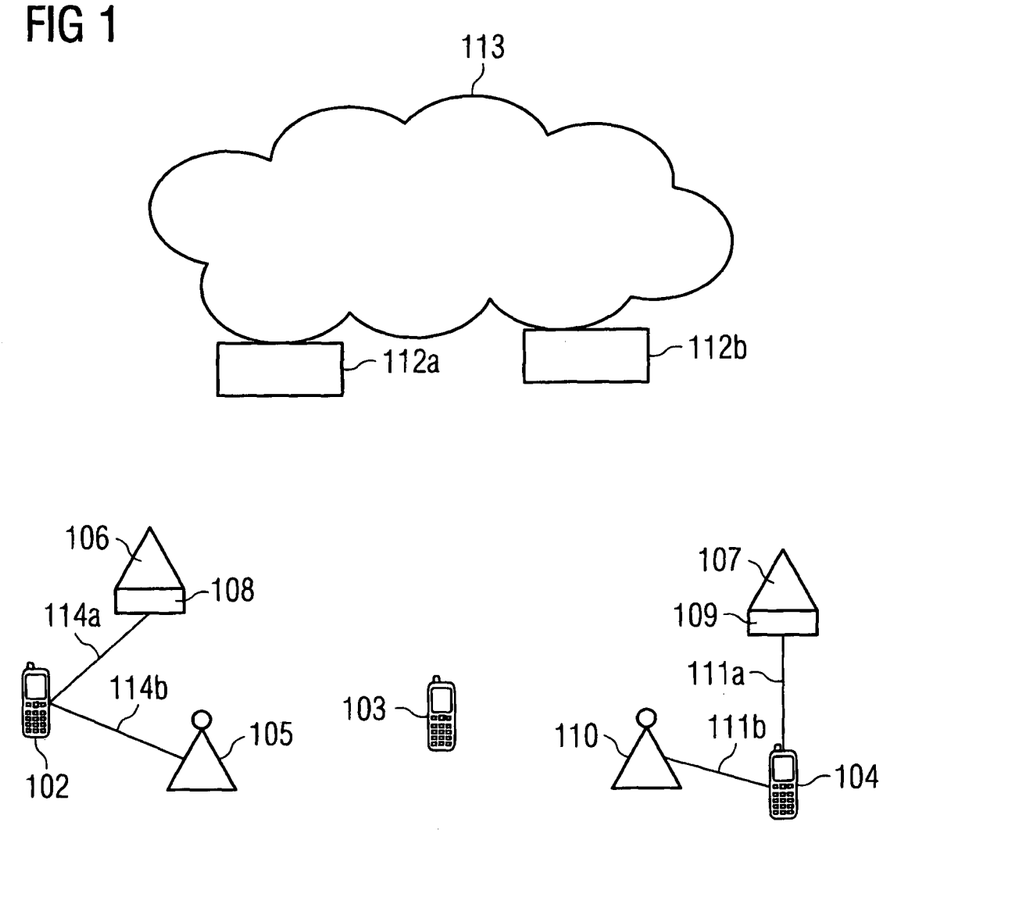
FIG. 1 shows an example of a telecommunications system in which embodiments may be implemented.

In FIG. 1 the master base station 106 is shown as connected to a wider communications network 113 via gateway 112a and the master base station 107 is shown as connected to a wider communications network 113 via gateway 112b. A further gateway function may be provided to connect to another network in some examples.

The smaller or secondary base stations 110 and 105 may also be connected to the network 113, for example via the gateways 112a and 112b and/or via the controllers 108, 109 of the macro level stations 106, 107. In the example, secondary base station 105 may be connected to the network via the controller 108 of the master base station 106 and/or may be connected via the gateway 112a. The secondary base station 110 may be connected to the network via the controller 109 of the master base station 107 and/or may be connected via the gateway 112b. The secondary base stations may for example be provided by a pico cell, a micro cell, and/or the like.

The communication system may support the user equipment 102 being in simultaneous communication with the base station 106 and the second base station 105. Similarly the use equipment 104 may be supported being in simultaneous communication with the secondary base station 110 and the master base station 107. The communication may thus support dual connectivity.

It will be appreciated that each base station may support a number of cells. In dual connectivity, the UE may be connected to a primary cell (PCell) of a macro base station and to cell(s) of a secondary base station. The PCell may be the cell of the macro base station to which the UE connects first and a macro base station supporting the PCell is considered to be a master base station, for example a MeNB.

The set of cells (including the PCell) that are supported by the master base station belong to the master cell group (MCG). The set of cells that are supported by the secondary base station belong to the secondary cell group (SCG). The base station supporting the SCG cells(s) is considered to the secondary base station, for example SeNB. The cells supported by the SeNB as well as the cells other than the PCell supported by the MeNB may be referred to as secondary cells (SCells). The UE may thus use a primary cell (PCell) supported by the MeNB as well as a plurality of secondary cells (SCells) supported by the MeNB and SeNB respectively. There may also be a special or primary secondary cell (PSCell) in the SeNB. In some embodiments, multiple component carriers are available at the MeNB and/or the SeNB and carrier aggregation (CA) may be used to aggregate these. The cells of the MCG and the SCG may be considered to be the serving cells for the UE.

In some examples, dual connectivity is implemented in a multi-layer heterogeneous network where the macro and small cells are deployed at different carrier frequencies.

In the following example, the UE is shown as being served by a single MeNB and a single SeNB. In these examples, the MCG and SCG cells may be on the MeNB and the SeNB respectively and inter-site CA may be applied on MeNB and SeNB separately. For simplicity, we assume a single MeNB and SeNB in the following embodiments however it will be appreciated that this is by way of example only and embodiments are not limited as such.

In the following, mention of the MeNB may refer to the PCell in the MCG, and mention of the SeNB may refer to the primary SCell (PSCell) of the SCG. The PSCell may be the first cell added as part of the SCG and it will be appreciated that the PSCell may carry out extended functionality in comparison to other secondary cells, for example by allocating resources for the uplink control channel for this group (PUCCH). In some embodiments the role of the PSCell may be reconfigured to be passed to another cell on the SeNB.

It will also be appreciated, that while the foregoing has described a particular type of architecture, embodiments are not monitored thereto and the implementation of embodiments may differ according to the requirements of the different network architectures in which they are implemented.

In a network implementing dual connectivity, a radio resource control (RRC) entity may be located at the MeNB for providing radio resource control signaling between the UE and the MeNB and in some embodiments a further network. The SeNB PSCell may not support RRC messaging and thus the RRC messaging takes place between the PCell and the UE. In some procedures, the SeNB may assist in RRC messaging by signaling one or more RRC containers providing RRC messages to the MeNB, for example the SeNB may signal the part of a RRC connection reconfiguration message that relates to the SCG to the MeNB in one or more RRC message containers that the MeNB then signals to UE via RRC messages.

In such a case, a failure of the radio link to the SeNB may not indicate that a RRC connection is lost and a RRC connection reestablishment may not be carried in response to a failure of a radio link between the UE and the SeNB. Radio link failure on the master link, i.e. link to PCell, however may indicate that a RRC connection is lost and RRC connection reestablishment may be initiated.

In such a case, when a UE detects a radio link failure on the master link (to the serving cell, for example the PCell) a RRC connection re-establishment procedure may be initiated towards the strongest neighbouring cell to the PCell. The strongest neighbouring cell may be considered the target cell and the PCell on which the radio link failure occurred may be considered to be the serving cell.

Prior to the radio link failure, the serving cell may have prepared potential target cells for accepting a UE connection, for example by providing UE context information and security information, for example access stratum (AS) security configuration, to the potential target cell(s). This information may for example comprise information used by the target cell to carry out the RRC connection re-establishment procedure with the UE. In some examples, this information may have been received due to a handover procedure, for example by receiving a HandoverPreparationInformation message from the serving cell.

The HandoverPreparationInformation message may be used to transfer the E-UTRA RRC information used by the target cell during handover preparation. This message may include for example UE capability and configuration information, security (AS) configuration and context, RRM configuration, etc. Admission control may be performed as part of the preparation, so when UE initiates re-establishment towards a prepared cell the UE is already accepted, so re-establishment will be successful. A serving eNB may prepare multiple neighboring eNBs, e.g. in a dense small cell environment, in order to increase the likelihood of recovery from RLF.

A prepared target cell may not need any further configuration or context information than what is supplied in the HandoverPreparationInformation message, in order to be able to re-establish the RRC connection for the UE.

In other cases, the serving cell may not have provided such information and a context fetch where the target cell fetches such UE context information may be supported.

The UE may initiate the recovery of the failed radio link by first performing cell selection (to select the strongest or most appropriate neighbouring cell) and then sending a RRC connection re-establishment request message to the selected cell. If this is the first access to this cell or if the UE has state out-of-sync for this cell, the lower layers may apply a random access procedure to get synchronization, before transferring the re-establishment request on the uplink shared channel (UL-SCH).

The RRC connection re-establishment request message may contain identifiers, for example a Cell Radio Network Temporary Identifier (C-RNTI), a Physical Cell Identifier (PCI), and a short MAC identifier (MAC-I), that the targeted cell prepared by UE context information being received from the serving cell may be aware of.

In some examples, a prepared cell may re-establish the RRC connection, while a non-prepared cell may reject. If the connection request is rejected the UE may go into a RRC IDLE state. In other examples, a targeted non-prepared cell may fetch the UE context from the previously serving cell and re-establish the connection.

Embodiments of the present application may recognise that the procedure carried out in response to a radio link failure may be complex. Embodiments of the present application may include taking advantage of the already connection secondary based station or secondary cells in such a case.

In some embodiments, a UE operating with dual connectivity and connected to both a PCell and a PSCell, may perform a fast cell reconfiguration to the PSCell to which it is already connected. The PSCell may for example re-establish a RRC connection for the UE. In these embodiments, a UE may be considered to have an automatic target cell, the PSCell, to which it is already connected for a RRC connection re-establishment. The PSCell may take over the role of the PCell on request from the UE. In embodiment, the PSCell may for example be provided with the information required to take over operation as a PCell in configuration information received during a dual connectivity set up. In some embodiments, this may reduce an outage time, i.e. time from the connection is lost until it is re-established, due to for example not requiring cell selection and the carrying out of a random access procedure.

It will be appreciated that a RRC connection re-establishment procedure where a RRC connection re-establishment request is sent to a PSCell may be referred to as a fast cell reconfiguration procedure for simplicity.

Figure 2:
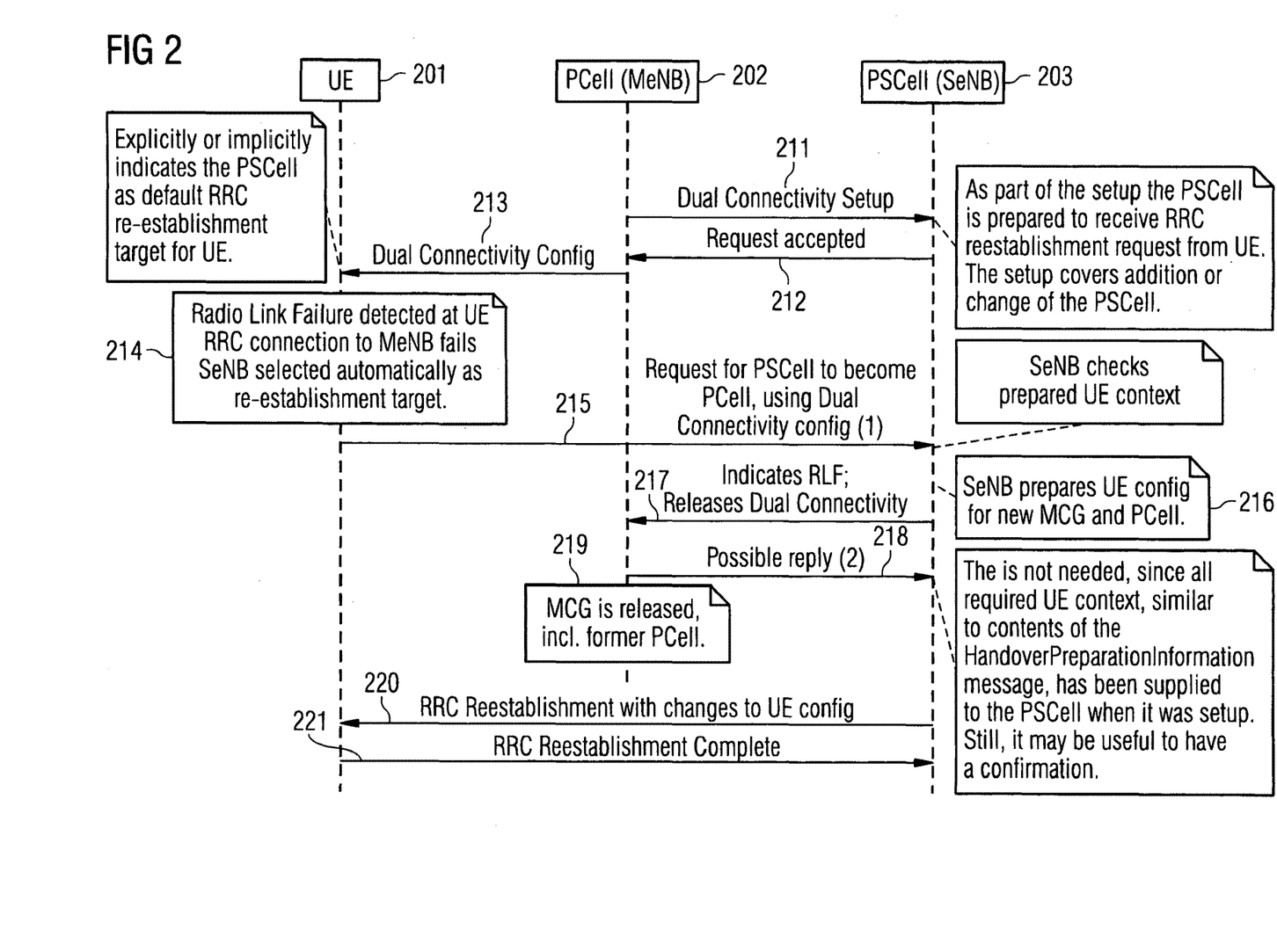
FIG. 2 is a signaling diagram showing an example of the signaling carried out in some embodiments.

FIG. 2 is a sequence diagram for the signaling (for example protocol actions) taken to perform a fast cell reconfiguration procedure in response to a failed radio link with a PCell for a UE in dual connectivity according to some embodiments.

In the example of FIG. 2, a PCell provides a PSCell information that is sufficient for performing the fast cell reconfiguration procedure, for example to setup an RRC entity when a RRC connection is lost. The UE may indicate to the PSCell that the RRC connection is lost, and may request that the PSCell provide the RRC entity. In this case, the request may correspond to a request that the PSCell takes over the functionality of the PCell.

The PSCell may reply and accept the request by responding with a response message. This response message may further provide any changes required in the UE configuration. The UE may reconfigure in response to the message and and send a complete message.

In the example of FIG. 2, the messaging between the PSCell and UE are depicted as being radio resource control (RRC) messages, for example messages based on the RRCConnectionReestablishmentRequest and RRCConnectionReestablishment of that protocol. It will be appreciated that these messages however may omit the need for carrying out random access because the UE is already in communication with the PSCell.

It will however be appreciated that this protocol is by way of example only and embodiments may be carried out with respect to other or enhanced protocols. For example, the information provided in the messages between the PSCell and UE may be provided by any protocol according to the communication system in which embodiments are implemented.

The messages between the MeNB and SeNB have been depicted in accordance with the X2 interface protocol. It will also be appreciated that the X2 interface is by way of example only and embodiments may be implemented in other communication systems implemented other protocol and interface.

FIG. 2 may depict a fast cell reconfiguration procedure for re-establishing an RRC connection by using a PSCell.

FIG. 2 shows a UE 201, PCell supported by a MeNB 202 and a PSCell supported by a SeNB 203. Steps 211, 212 and 213 of the figure may show a configuration by the PCell 202 of the PSCell 203 and the UE 201.

At step 211, the PCell sends a dual connectivity setup message to the PSCell. The dual connectivity message may include UE context information. The UE context information may be used by the SeNB in a fast cell reconfiguration procedure. In some embodiments, the dual connectivity setup message may additionally include dual connectivity configuration information. The UE context may comprise information relating to carrying out the functionality of a primary cell. For example, where the functionality of the primary cell comprises providing a radio resource control connection for the user equipment, the UE context comprises information may relate to providing a radio resource control connection. In some embodiments, the UE context may comprise radio resource control connection parameters for the user equipment.

The MeNB may further provide security information for the UE as part of the user context. This may allow a security activation for the UE to be performed immediately when carrying out the fast cell configuration procedure.

It will be appreciated that in some embodiments, the dual connectivity setup message may be a HandoverPreparationInformation message.

At step 212, the SeNB 203 may respond to the MeNB 202 with a message indicating that that the request is accepted. It will be appreciated that in some cases, the request at 211 may not be accepted, for example if the PSCell 203 does not have access to sufficient resources.

At step 213, the PCell may send a configuration message to the UE 201. The configuration message 213 may include information for the UE configuration such as indicating whether a fast cell reconfiguration procedure is to be used, for example configuring the UE to send a request for the PSCell to become the PCell" message on a radio link failure.

In some embodiments, such configuration information may be implicit—for example that the UE is configured to perform a fast cell reconfiguration procedure by default. It will be appreciated that in this case such configuration may not be explicitly indicated in the signaling.

In other embodiment the configuration of a fast cell reconfiguration procedure may be explicitly indicated. For example, the network may have the option of indicating that the procedure is not to be used. This may imply that the UE follow existing RRC connection re-establishment procedure and for example perform cell selection, and possibly target another cell than the PSCell.

In some embodiments, it may be optional for the UE to make use of the network indicating availability of a fast cell reconfiguration procedure. In other embodiments it may be mandatory for the UE to make use of an indicated fast cell reconfiguration procedure. In some examples, the configuration message to the UE may indicate whether making use of a fast cell reconfiguration procedure when indicated is mandatory or optional.

In some embodiments the configuration information may include configuration of when (or under what conditions) a PSCell is deemed able to carry out a a fast cell reconfiguration procedure, for example by indicating signal thresholds or measurement event triggers.

In some embodiment, the information in the message 213 may be providing in a reconfiguration message to the UE. In case of reconfigurations that do not affect the SCG configuration, the new configuration may be provided to the SeNB, for example by repeating the handover preparation procedure.

At step 214, the UE may detect a failure of a radio link between the UE and the PCell. At step 215, the UE 201 sends a request to re-establish a RRC connection to the PSCell 203.

In this embodiment, the request 215 is sent when a radio link or RRC connection failure is detected however, the message may optionally be triggered under further conditions in some embodiments. For example the UE may be aware of conditions under which a fast cell reconfiguration procedure may take place. In one example the message 215 is sent if the conditions are met, the UE is in dual connectivity and is configured to perform a fast cell reconfiguration procedure and a radio link has filed. In some embodiments, a condition may be that the UE detects a radio link loss and the cannot recover the radio link with the MeNB.

The message 215 may be a request by the UE towards the PSCell for the PSCell to take on the role as PCell, following the UE detection of a Radio Link Failure, or other cause of losing the RRC connection. This signal may be implemented as a new signal, or possibly as a modification to an existing signal.

In some embodiment, the message 215 may be an RRC connection re-establishment request message, for example according to the existing RRC connection re-establishment. The RRC connection re-establishment request message may for example be modified to pass all information required by the fast cell configuration procedure.

With message 215, the UE sends a re-establishment request to a cell (the PSCell) under the SeNB. The SeNB is already prepared (for example, having the UE context and/or the security key) and the UE does not need to go to into an idle state but a normal radio link recovery in the prepared cell may be performed.

On receipt of the message 215, the PSCell may determine the UE context information received in configuration information from the MeNB. The PSCell may check the UE context availability based on the dual connectivity configuration information. In some embodiments, the PSCell may further check for example AS security information availability for the UE. The security information may have been provided to the PSCell as part of the UE context information.

If the UE context information is found, the SeNB may prepare UE configuration information for the PSCell to become the new PCell and the SCG to become the MCG at step 216.

The SeNB may further indicate to the PCell that a radio link failure has occurred and request a release of the UE at step 217.

The MeNB may respond to the message 217 at 218. It will be appreciated that the message 218 may be optional. This message may indicate to the former PCell/MeNB that the former MCG must be released At step 219 the MCG and PCell may be released.

At step 220, the PSCell may indicate to the UE that it accepts the connection. The PSCell may reply by accepting the connection and providing any changes required in UE configuration. In some embodiments, the re-establishment procedure may continue without modification after this.

For example, in response to message 220, the UE may reconfigure and send a complete message 221.

Figure 3:
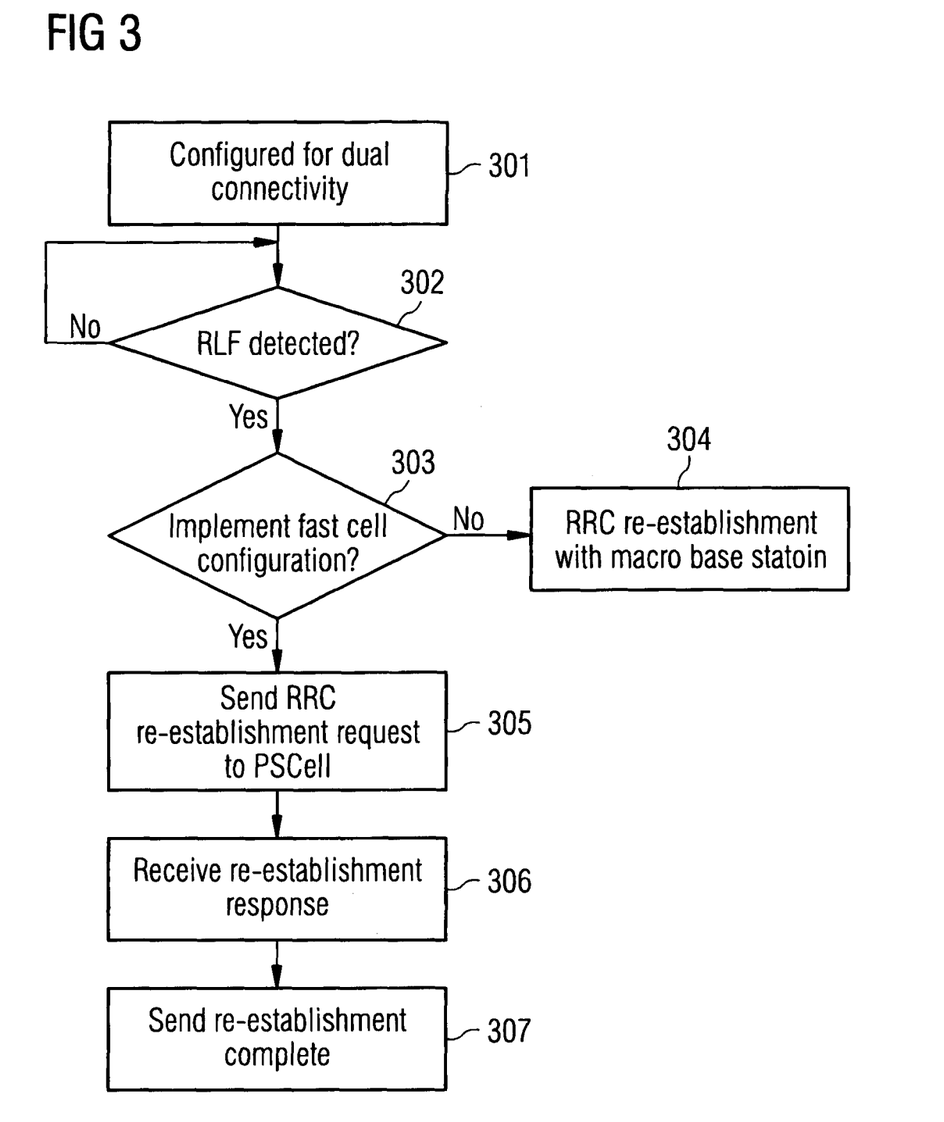
FIG. 3 is a flow diagram showing an example of the method steps carried out by a user equipment.

FIG. 3 is a flow diagram indicating the method steps carried out by a UE in accordance with an embodiment.

At step 301 of FIG. 3, the UE may be configured for dual connectivity. The configuration information may be received in a dual connectivity configuration message from the MeNB 202. The UE may be configured to implement fast cell reconfiguration by default, be explicitly signaled to carry out fast cell reconfiguration and/or configured to carry out fast cell configuration under certain conditions. It will be appreciated that these conditions may be indicated to the UE.

At step 302, the UE may detect a radio link failure between the UE and the MeNB. It will be appreciated that while a radio link failure has been exemplified, any loss of a radio link between the UE and the MeNB may trigger the fast cell reconfiguration procedure.

At step 303, the UE may determine whether to carry out the fast cell reconfiguration procedure If the UE is configured to only carry out the fast cell reconfiguration procedure under certain conditions, the UE determines whether the conditions for carrying out the fast cell reconfiguration procedure are satisfied.

In some embodiments these conditions may correspond to one or more of the following: the PSCell quality metric is larger than network-provided threshold and the quality may be reference signal receive power (RSRP), reference signal receive quality (RSRQ), channel quality indicator (CQI), throughput or other measured metric at the UE; and/or the PSCell quality is greater than a first threshold and/or any other cell's quality is greater than a second threshold, for example it is determined that the PSCell is a feasible candidate for re-establishment. Step 303 may be optional. For example, if the UE is configured to carry out the procedure by default or explicitly configured to carry out the procedure, step 303 may be omitted.

If it is determined at step 303 that the conditions are not satisfied, the method proceeds to step 304 where the fast cell reconfiguration procedure is not carried out, for example a RRC reconfiguration procedure is carried out with the MeNB or neighbouring macro base station.

If it is determined at step 303 that the conditions are satisfied or if step 303 is omitted, the method proceeds to step 305 where the UE sends an RRC re-establishment request to the PSCell. It will be appreciated that this may for example correspond to message 215 in FIG. 2.

At step 306, the UE may receive a response to the message sent at 305. This message may for example correspond to the message 220 in FIG. 2. The response message may for example accept the request send at step 305 and optionally include any further configuration information for the UE.

The configuration information may inform the UE how to continue the RRC connection with the SeNB and may confirm that the re-establishment is successful. In some embodiments, the re-establishment response may activate UE security as well so that the UE can continue normal communication with the (new) eNB. The message at step 306 may confirm to the UE that re-establishment request can be serviced and the RRC connection can continue without going via RRC_IDLE.

At step 307, the UE may send a RRC re-establishment complete message to the PSCell.

Figure 4:
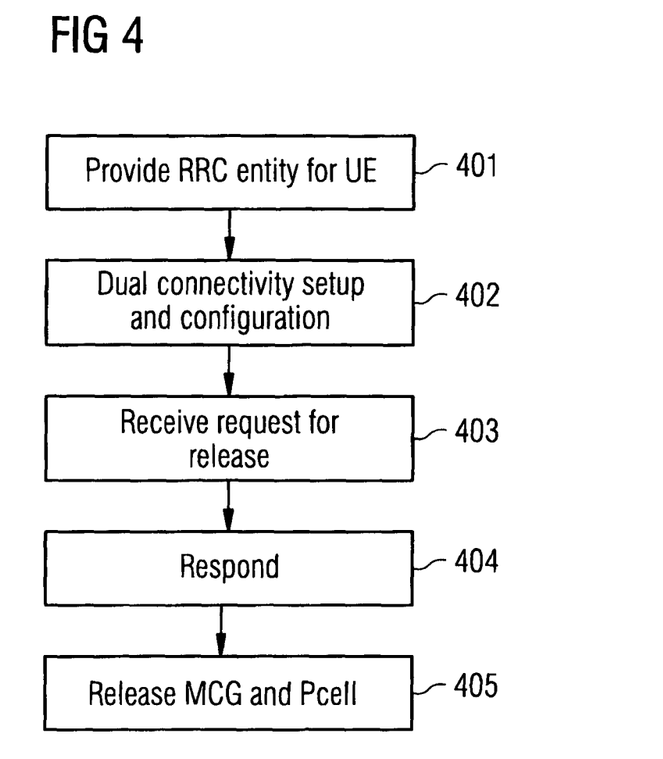
FIG. 4 is a flow diagram showing an example of the method carried out by a primary cell.

FIG. 4 is a flow diagram indicating the method steps carried out by a MeNB in accordance with an embodiment.

At step 401, the MeNB may provide a RRC entity for a UE.

At step 402, the MeNB may carry out a configuration of the UE for dual connectivity and set up a SeNB for dual connectivity. This may be for example be carried out by sending the setup request and response messages 211 and 212 and the configuration message 213 in FIG. 2.

At step 403, the MeNB may receive a request from the SeNB. The request may request that the MeNB release the MCG for the UE including the PCell for the UE. The request may indicate that a radio link failure has occurred between the UE and the MeNB. It will be appreciated that in some embodiments, the request at step 403 may explicitly indicate the request for release, for example identify cells for release. In other embodiments, the request may indicate a radio link failure and the MeNB may be configured to release the MCG and PCell in response thereto. This may for example correspond to the message 217 of FIG. 2.

At step 404, the MeNB may optionally respond to the request received at step 403. It will be appreciated that this response may correspond to the message 218.

At step 405, the MeNB may release the MCG and PCell. This may for example correspond to step 219 of FIG. 2.

The MeNB may in some embodiments provide the PCell for a UE and configure the UE and an SeNB for dual connectivity. The MeNB may configure the UE and SeNB to carry out a fast cell reconfiguration procedure if a radio link between the MeNB and UE is lost. The MeNB may receive a request from the SeNB to indicate that a radio link has failed and release the dual connectivity resources of the MeNB for the UE.

It will be appreciated that while in FIG. 4 reference has been made to the MeNB, it will be appreciated that the PCell of the MeNB may carry out the method steps in some embodiments.

Figure 5:
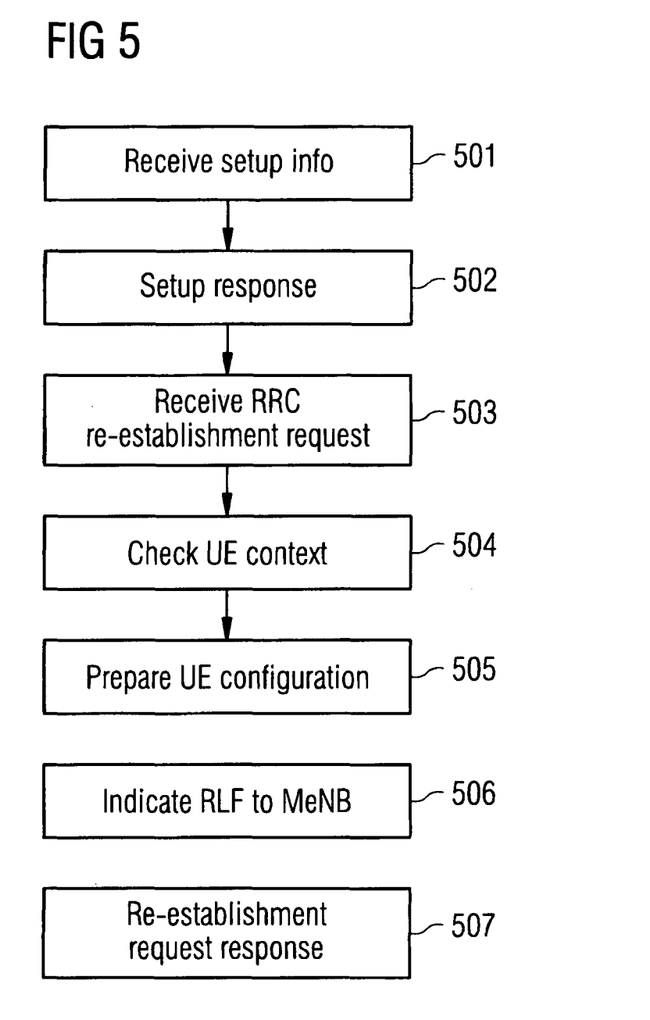
FIG. 5 is a flow diagram showing an example of the method carried out by a primary secondary cell.

FIG. 5 is a flow diagram indicating the method steps carried out by a SeNB in accordance with an embodiment.

At steps 501 and 502 of FIG. 5, the SeNB is setup as a secondary base station for dual connectivity with a UE. The setup may correspond to receiving a dual connectivity setup message 211 from the MeNB at step 501 and providing a response message 212 at step 502. The setup message may for example include a UE context including information for the SeNB to provide an RRC entity.

For example, UE context information may be information suitable to establish the necessary overall initial UE context including E-RAB context, the security key, handover restriction list, UE radio capability and UE Security Capabilities etc. The procedure may uses UE-associated signaling. The UE context information may for example indicate one or more of: UE capabilities, UE security setup, UE bearer configuration and/or Restrictions to how UE is handled in the network. The UE contact may comprise information about how the UE should be configured and data transferred when in connected mode.

At step 503, the SeNB may receive a message from the UE requesting the re-establishment of a radio resource connection. This may for example correspond to the message 215 of FIG. 3.

At step 504, the SeNB may determine whether it holds the UE context for the requesting UE. If it does not hold the context, it may be unable to provide the PCell for the UE and may reject the request.

At step 505, the SeNB may prepare configuration information for the UE for the SeNB to act as the new PCell and MCG. This may for example correspond to step 216 of FIG. 2.

At step 506, the SeNB may inform the previous (failed) PCell of the MeNB of the radio link loss. This may for example correspond to step 217 of FIG. 2.

At step 507, the SeNB may send a re-establishment response to the UE. This may for example include the new configuration information for the UE. The SeNB may receive a re-establishment complete message from the UE. This may for example correspond to messages 220 and 221 of FIG. 2.

In some embodiments, such a procedure as described in the foregoing may allow the application of a more aggressive handover, for example faster triggering (such as lower time to trigger or lower thresholds) since the likelihood of a successful handover may be higher than when handing over to a non-PSCell.

Figure 6:
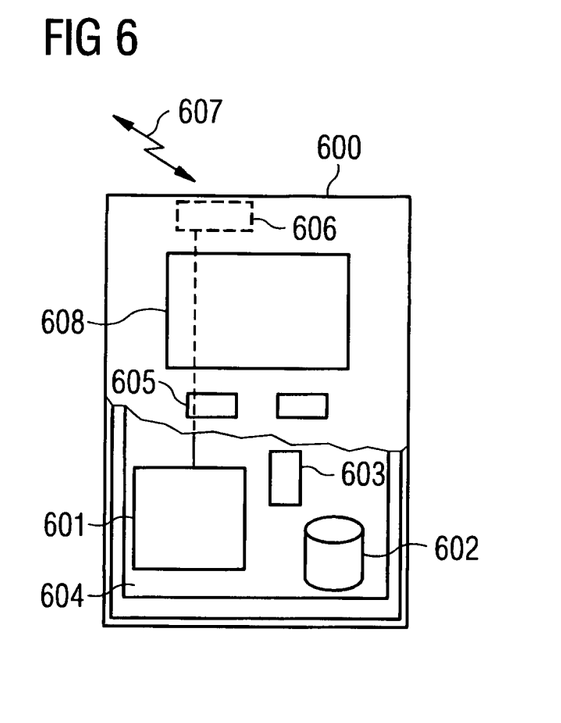
FIG. 6 is a schematic diagram showing an example of a user equipment that may be used in some embodiments.

A possible communication device will now be described in more detail with reference to FIG. 6 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 102 may receive signals over an air or radio interface 607 via appropriate apparatus for receiving and may transmit signals via appropriate apparatus for transmitting radio signals. In FIG. 6, a transceiver apparatus is designated schematically by block 606. The transceiver apparatus 606 may be provided for example by means of a radio part and associated antenna arrangement. The antenna arrangement may be arranged internally or externally to the device.

A device is typically provided with at least one data processing entity 601, at least one memory 602 and other possible components 603 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 604. The user may control the operation of the device by means of a suitable user interface such as key pad 605, voice commands, touch sensitive screen or pad, combinations thereof or the like. A display 608, a speaker and a microphone can be also provided. Furthermore, a communication device may comprise appropriate connectors (either wired or wireless) to other devices and/or for connecting external accessories, for example hands-free equipment, thereto.

The communication devices 102, 103, 104 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

When the dual connectivity network of FIG. 1 is implemented in accordance with LTE, there may be an S1-MME/S1-U air interface between the gateway 112a and 112b and the master bases station 106, 107 respectively. The interface between the gateway 112a, 112b and secondary base stations 105, 110 may be an S1-U interface. An X2 interface may be provided between the secondary base station 105, 105 and master base station 106, 107 respectively and between two master base stations 106, 107.

Figure 7:
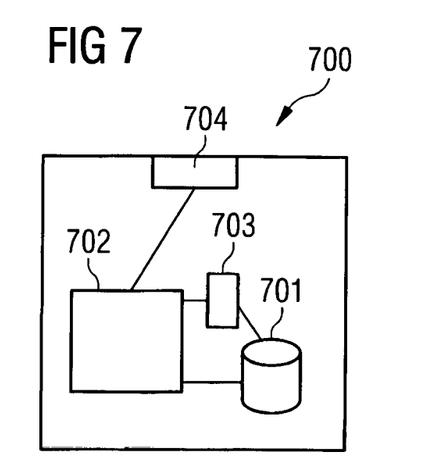
FIG. 7 is a schematic diagram showing an example of an apparatus that may be used in some embodiment.

FIG. 7 shows an example of a control apparatus. The control apparatus comprises at least one memory 701, at least one data processing unit 702, 703 and an input/output interface 704. Via the interface the control apparatus can be coupled to receive and/or transmit data. For example the control apparatus can be configured to execute an appropriate software code to provide the control functions. The control apparatus may be provided in one or more of master base station, a secondary base station and any other suitable control entity.

It is noted herein that while the above describes exemplifying embodiments of the invention, there are several variations and modifications which may be made to the disclosed solution without departing from the scope of the present invention.

It will be appreciated that while the foregoing refers to the fast cell configuration procedure being triggered in response to a radio link failure, it will be appreciated that such a procedure may be triggered by other causes of losing a RRC connection.

It will be appreciated that while the foregoing uses the term base station, it will be appreciated that the base station may be a network node to provide access to a user equipment to a network. The base station may be a node B, e Node B and/or a base transceiver station in some embodiments. Some embodiments have been described in relation to LTE in which case the base station will be an eNode B.

It will also be appreciated that while the foregoing has exemplified a system comprising a macro node providing a primary cell and a smaller cell provided a primary secondary cell, in some embodiments, the primary secondary cell may be provided by another macro node. In other words in some embodiments, the user equipment may be in dual connectivity for two nodes of a same type, for example macro nodes and/or smaller nodes.

It will be appreciated that while the foregoing uses the term user equipment, it will be appreciated that the user equipment may be any communication device for accesses a network. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

The required data processing apparatus and functions of a base station apparatus, a communication device or user equipment and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

The applicant draws attention to the fact that the present invention may include any feature or combination of features disclosed herein either implicitly or explicitly or any generalization thereof, without limitation to the scope of any definitions set out above. In addition to the modifications explicitly mentioned above, it will be evident to a person skilled in the art that various other modifications of the described embodiment may be made within the scope of the invention.

The invention claimed is:

1. A method comprising:
providing a primary cell by a first node for a user equipment operating in dual-connectivity with the first node and a second node;
configuring, by the primary cell and prior to a radio link between the primary cell and the user equipment being lost, the user equipment to send, in response to the radio link between the user equipment and the primary cell being lost, a request to a primary secondary cell provided by the second node requesting that the primary secondary cell provide functionality of the primary cell and to become a new primary cell for the user equipment;
providing, by the primary cell and prior to the radio link between the primary cell and the user equipment being lost, user equipment context of the user equipment to the primary secondary cell for use by the primary secondary cell to provide the functionality of the primary cell and to become the new primary cell for the user equipment.

2. The method of claim 1 wherein the user equipment context comprises information relating to carrying out the functionality of the primary cell.

3. The method of claim 1 where the functionality of the primary cell comprises providing a radio resource control connection for the user equipment.

4. The method of claim 3 wherein the user equipment context comprises information relating to providing the radio resource control connection.

5. The method of claim 1 wherein the user equipment context comprises radio resource control connection parameters for the user equipment.

6. The method of claim 1 further comprising:
providing the user equipment context to the primary secondary cell during a dual connectivity setup procedure.

7. The method of claim 1 wherein configuring the user equipment further comprising configuring the user equipment during a dual connectivity configuration procedure.

8. The method of claim 1 further comprising:
receiving a request from the primary secondary cell to release the primary cell for the user equipment.

9. The method of claim 8 further comprising:
releasing the primary cell for the user equipment in response to the request from the primary secondary cell to release the primary cell for the user equipment.

10. The method of claim 1, wherein the user equipment context comprises one or more of the following: E-RAB context; a security key; a handover restriction list; user equipment radio capability; or user equipment security capabilities.

11. The method of claim 1, wherein the primary cell provides a radio resource control connection on the radio link between the user equipment and the primary cell, and wherein the user equipment context provided from the primary cell to the primary secondary cell allows the primary secondary cell to respond to a radio resource control reestablishment request from the user equipment by reestablishing the radio resource control connection on a radio link between the user equipment and the primary secondary cell.

12. A method comprising:
   providing a primary secondary cell by a second node for a user equipment operating in dual connectivity with a first node and the second node;
   receiving, prior to the user equipment losing a radio link between the user equipment and a primary cell provided by the first node, at the second node and from the first node indication of user equipment context to be used by the second node to carry out functionality of a primary cell, in response to a request from the user equipment requesting that the primary secondary cell provide functionality of the primary cell;
   receiving by the primary secondary cell the request from the user equipment requesting that the primary secondary cell provide functionality of the primary cell and to become a new primary cell for the user equipment, wherein the request is received in response to the radio link between the user equipment and the primary cell provided by the first node being lost;
   providing, based on the previously received user equipment context, by the primary secondary cell the functionality of the primary cell for the user equipment in response to the request; and
   performing by the second node one or more actions to become the new primary cell for the user equipment.

13. The method of claim 12, further comprising:
   receiving the user equipment context from the primary cell during a dual connectivity setup procedure, the user equipment context received from the primary cell prior to receiving the request from the user equipment.

14. The method of claim 12, further comprising:
   determining that the request from the user equipment corresponds to the user equipment context received from the primary cell and using the user equipment context to provide, at least in part, the functionality of the primary cell and to perform the one or more actions to become the new primary cell.

15. The method of claim 14 further comprising:
   generating dual connectivity configuration information for the user equipment and using the dual connectivity configuration information for the user equipment to provide, at least in part, the functionality of the primary cell and to perform the one or more actions to become the new primary cell.

16. The method of claim 12, wherein the user equipment context comprises one or more of the following: E-RAB context; a security key; a handover restriction list; user equipment radio capability; or user equipment security capabilities.

17. A network access node comprising at least one processor and a memory including computer program code, the memory and the computer program code configured, with the at least one processor, to cause the network access node to perform operations comprising:
   provide a primary cell for a user equipment operating in dual connectivity with the network access node and a second node;
   configure, by the primary cell and prior to a radio link between the primary cell and the user equipment being lost, the user equipment to send, in response to the radio link between the user equipment and the primary cell being lost, a request to a primary secondary cell provided by the second node requesting that the primary secondary cell provide the functionality of the primary cell and to become a new primary cell for the user equipment; and
   providing, by the primary cell and prior to the radio link between the primary cell and the user equipment being lost, user equipment context of the user equipment to the primary secondary cell for use by the primary secondary cell to provide the functionality of the primary cell and to become the new primary cell for the user equipment.

18. A network access node comprising at least one processor and a memory, the at least one processor and memory configured to:
   provide a primary secondary cell for a user equipment operating in dual connectivity with a first node and the network access node;
   receive, prior to the user equipment losing a radio link between the user equipment and a primary cell provided by the first node, at the second node and from the first node indication of user equipment context to be used by the second node to carry out functionality of a primary cell, in response to a request from the user equipment requesting that the primary secondary cell provide functionality of the primary cell;
   receive by the primary secondary cell the request from the user equipment requesting that the primary secondary cell provide functionality of the primary cell and to become a new primary cell for the user equipment, wherein the request is received in response to the radio link between the user equipment and the primary cell provided by the first node being lost;
   providing, based on the previously received user equipment context, by the primary secondary cell the functionality of the primary cell for the user equipment in response to the request; and
   performing by the primary secondary cell one or more actions to become the new primary cell for the user equipment.

19. A method comprising:
   receiving by a user equipment a configuration message from a primary cell configuring the user equipment to send a request to a primary secondary cell requesting that the primary secondary cell provide functionality of the primary cell and to become a new primary cell for the user equipment in response to a radio link between the user equipment and the primary cell being lost;
   determining by the user equipment operating in dual connectivity with the primary cell provided by a first node and the primary secondary cell provided by a second node that the radio link with the primary cell is lost;
   sending, by the user equipment and in response to radio link with the primary cell being lost, a request to the primary secondary cell requesting that the primary secondary cell provide the functionality of the primary cell and to become a new primary cell for the user equipment, the functionality comprising radio resource control connection on a radio link between the primary second call and the user equipment;
   receiving by the user equipment a message from the second node indicating reestablishment of the radio resource control connection on the radio link; and
   communicating by the user equipment using the reestablished radio resource control connection on the radio link between the second node as primary cell and the user equipment.

* * * * *